(12) United States Patent
Kawahashi et al.

(10) Patent No.: US 8,623,551 B2
(45) Date of Patent: Jan. 7, 2014

(54) POSITIVE-ELECTRODE ACTIVE MATERIAL FOR LITHIUM ION BATTERY, POSITIVE ELECTRODE FOR LITHIUM ION BATTERY, AND LITHIUM ION BATTERY

(75) Inventors: Yasuhiro Kawahashi, Kitaibaraki (JP); Kentaro Okamoto, Kitaibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

(21) Appl. No.: 13/582,091

(22) PCT Filed: Mar. 4, 2011

(86) PCT No.: PCT/JP2011/055111
§ 371 (c)(1),
(2), (4) Date: Aug. 31, 2012

(87) PCT Pub. No.: WO2011/108720
PCT Pub. Date: Sep. 9, 2011

(65) Prior Publication Data
US 2012/0321956 A1    Dec. 20, 2012

(30) Foreign Application Priority Data
Mar. 5, 2010    (JP) .................... 2010-049146

(51) Int. Cl.
*H01M 4/13*    (2010.01)
*H01M 4/50*    (2010.01)
(52) U.S. Cl.
USPC ........ 429/218.1; 429/220; 429/221; 429/223; 429/224
(58) Field of Classification Search
None
See application file for complete search history.

(56) References Cited

U.S. PATENT DOCUMENTS

| 5,393,622 | A | 2/1995 | Nitta et al. |
| 5,478,674 | A | 12/1995 | Miyasaka |
| 6,123,911 | A | 9/2000 | Yamaguchi et al. |
| 6,423,447 | B1 | 7/2002 | Ohsaki et al. |
| 6,582,854 | B1 | 6/2003 | Qi et al. |
| 6,984,469 | B2 | 1/2006 | Kweon et al. |

(Continued)

FOREIGN PATENT DOCUMENTS

| EP | 0903796 A1 | 3/1999 |
| EP | 1244164 A1 | 9/2002 |

(Continued)

OTHER PUBLICATIONS

International Search Report mailed Jun. 8, 2010 in co-pending PCT application No. PCT/JP2010/053443.

(Continued)

*Primary Examiner* — Ula C Ruddock
*Assistant Examiner* — Matthew Van Oudenaren
(74) *Attorney, Agent, or Firm* — Nields, Lemack & Frame, LLC

(57) ABSTRACT

The present invention provides a positive electrode active material for a lithium ion battery having good battery performance can be provided. The positive electrode active material for a lithium ion battery is represented by;

Compositional formula: $Li_xNi_{1-y}M_yO_{2+\alpha}$ wherein M is one or more selected from Sc, Ti, V, Cr, Mn, Fe, Co, Cu, Zn, Ga, Ge, Al, Bi, Sn, Mg, Ca, B, and Zr, $0.9 \leq x \leq 1.1$, $0 < y \leq 0.7$, and $0.05 \leq \alpha \leq 0.2$,
and contains primary particles and has a tap density of 1.3 to 2.6 g/cm³. The average particle size of the primary particles is 0.3 to 3.0 µm and the specific surface area is 0.3 to 2.3 m²/g.

9 Claims, 2 Drawing Sheets

Example 1

Example 2

Comparative Example 1

(56) References Cited

U.S. PATENT DOCUMENTS

| | | | |
|---|---|---|---|
| 7,410,728 | B1 | 8/2008 | Fujimoto et al. |
| 2003/0082448 | A1 | 5/2003 | Cho et al. |
| 2003/0211391 | A1 | 11/2003 | Cho et al. |
| 2004/0110063 | A1 | 6/2004 | Uchitomi et al. |
| 2005/0079416 | A1 | 4/2005 | Ohzuku et al. |
| 2005/0142442 | A1 | 6/2005 | Yuasa et al. |
| 2005/0158546 | A1 | 7/2005 | Shizuka |
| 2006/0083989 | A1 | 4/2006 | Suhara et al. |
| 2006/0121350 | A1 | 6/2006 | Kajiya et al. |
| 2006/0127765 | A1 | 6/2006 | Machida et al. |
| 2006/0204849 | A1 | 9/2006 | Saito et al. |
| 2006/0281005 | A1 | 12/2006 | Cho et al. |
| 2007/0015058 | A1 | 1/2007 | Takezawa et al. |
| 2007/0141469 | A1 | 6/2007 | Tokunaga et al. |
| 2008/0044736 | A1 | 2/2008 | Nakura |
| 2008/0081258 | A1 | 4/2008 | Kim et al. |
| 2009/0117464 | A1 | 5/2009 | Cho et al. |
| 2009/0117469 | A1 | 5/2009 | Hiratsuka et al. |
| 2009/0148772 | A1 | 6/2009 | Kawasato et al. |
| 2009/0233176 | A1 | 9/2009 | Kita et al. |
| 2009/0289218 | A1 | 11/2009 | Kajiya et al. |
| 2009/0299922 | A1 | 12/2009 | Malcus et al. |
| 2010/0015514 | A1 | 1/2010 | Miyagi et al. |
| 2010/0019194 | A1 | 1/2010 | Fujiwara et al. |
| 2010/0112447 | A1 | 5/2010 | Yamamoto et al. |
| 2010/0143583 | A1 | 6/2010 | Honda et al. |
| 2010/0183922 | A1 | 7/2010 | Cho et al. |
| 2010/0209757 | A1 | 8/2010 | Ooyama et al. |
| 2010/0209771 | A1 | 8/2010 | Shizuka et al. |
| 2011/0031437 | A1 | 2/2011 | Nagase et al. |
| 2011/0250499 | A1 | 10/2011 | Hiratsuka |
| 2012/0034525 | A1 | 2/2012 | Satoh et al. |
| 2012/0231342 | A1 | 9/2012 | Satoh et al. |
| 2012/0231343 | A1 | 9/2012 | Nagase et al. |
| 2012/0244434 | A1 | 9/2012 | Nagase |
| 2012/0292562 | A1 | 11/2012 | Kajiya et al. |
| 2012/0319036 | A1 | 12/2012 | Kajiya et al. |
| 2012/0319037 | A1 | 12/2012 | Kawahashi et al. |
| 2012/0319039 | A1 | 12/2012 | Satoh |
| 2012/0319040 | A1 | 12/2012 | Okamoto et al. |
| 2012/0326080 | A1 | 12/2012 | Okamoto et al. |
| 2012/0326098 | A1 | 12/2012 | Satoh |
| 2012/0326099 | A1 | 12/2012 | Satoh |
| 2012/0326101 | A1 | 12/2012 | Satoh |
| 2012/0326102 | A1 | 12/2012 | Satoh |
| 2013/0001463 | A1 | 1/2013 | Okamoto et al. |
| 2013/0004849 | A1 | 1/2013 | Satoh |
| 2013/0043428 | A1 | 2/2013 | Kawahashi et al. |
| 2013/0143121 | A1 | 6/2013 | Kobayashi et al. |
| 2013/0175470 | A1 | 7/2013 | Kajiya et al. |
| 2013/0221271 | A1 | 8/2013 | Nagase et al. |

FOREIGN PATENT DOCUMENTS

| | | |
|---|---|---|
| EP | 1391950 A1 | 2/2004 |
| EP | 2207226 A1 | 7/2010 |
| EP | 2207227 A1 | 7/2010 |
| JP | 4-328277 A | 11/1992 |
| JP | 7-29603 A | 1/1995 |
| JP | 7-211311 A | 8/1995 |
| JP | 8-138669 A | 5/1996 |
| JP | 10-83815 A | 3/1998 |
| JP | 10-116618 A | 5/1998 |
| JP | 10-188986 A | 7/1998 |
| JP | 10-206322 A | 8/1998 |
| JP | 10-208744 A | 8/1998 |
| JP | 10-302779 A | 11/1998 |
| JP | 10-321224 A | 12/1998 |
| JP | 11-67205 A | 3/1999 |
| JP | 11-292542 A | 10/1999 |
| JP | 11-307094 A | 11/1999 |
| JP | 11-345615 A | 12/1999 |
| JP | 2000-72445 A | 3/2000 |
| JP | 2000-149945 A | 5/2000 |
| JP | 2000-215884 A | 8/2000 |
| JP | 2001-110420 A | 4/2001 |
| JP | 2001-148249 A | 5/2001 |
| JP | 2001-223008 A | 8/2001 |
| JP | 2001-266851 A | 9/2001 |
| JP | 2002-63901 A | 2/2002 |
| JP | 2002-164053 A | 6/2002 |
| JP | 2002-203552 A | 7/2002 |
| JP | 2002-216745 A | 8/2002 |
| JP | 2002-260655 A | 9/2002 |
| JP | 2002-298914 A | 10/2002 |
| JP | 3334179 B2 | 10/2002 |
| JP | 2003-7299 A | 1/2003 |
| JP | 2003-17052 A | 1/2003 |
| JP | 2003-81637 A | 3/2003 |
| JP | 2003-151546 A | 5/2003 |
| JP | 2004-6264 A | 1/2004 |
| JP | 2004-193115 A | 7/2004 |
| JP | 2004-227790 A | 8/2004 |
| JP | 2004-355824 A | 12/2004 |
| JP | 2005-11713 A | 1/2005 |
| JP | 2005-053764 * | 3/2005 |
| JP | 2005-53764 A | 3/2005 |
| JP | 2005-56602 A | 3/2005 |
| JP | 2005-60162 A | 3/2005 |
| JP | 2005-75691 A | 3/2005 |
| JP | 2005-183366 A | 7/2005 |
| JP | 2005-235624 A | 9/2005 |
| JP | 2005-243636 A | 9/2005 |
| JP | 2005-285572 A | 10/2005 |
| JP | 2005-289700 A | 10/2005 |
| JP | 2005-302507 * | 10/2005 |
| JP | 2005-302507 A | 10/2005 |
| JP | 2005-302628 A | 10/2005 |
| JP | 2005-324973 A | 11/2005 |
| JP | 2005-332707 A | 12/2005 |
| JP | 2005-347134 A | 12/2005 |
| JP | 2006-4724 A | 1/2006 |
| JP | 2006-19310 A | 1/2006 |
| JP | 2006-54159 A | 2/2006 |
| JP | 2006-107818 A | 4/2006 |
| JP | 2006-107845 A | 4/2006 |
| JP | 2006-127923 * | 5/2006 |
| JP | 2006-127923 A | 5/2006 |
| JP | 2006-127955 A | 5/2006 |
| JP | 2006-134852 A | 5/2006 |
| JP | 2006-156126 A | 6/2006 |
| JP | 2006-156235 A | 6/2006 |
| JP | 2006-164758 A | 6/2006 |
| JP | 2006-286614 A | 10/2006 |
| JP | 3835266 B2 | 10/2006 |
| JP | 2006-351379 A | 12/2006 |
| JP | 2007-48744 A | 2/2007 |
| JP | 2007-95443 A | 4/2007 |
| JP | 2007-194202 A | 8/2007 |
| JP | 2007-214138 A | 8/2007 |
| JP | 2007-226969 A | 9/2007 |
| JP | 2007-227368 A | 9/2007 |
| JP | 2007-257890 A | 10/2007 |
| JP | 2007-280723 A | 10/2007 |
| JP | 2008-13405 A | 1/2008 |
| JP | 4070585 B2 | 4/2008 |
| JP | 2008-103132 A | 5/2008 |
| JP | 2008-181708 A | 8/2008 |
| JP | 2008-266136 A | 11/2008 |
| JP | 2008-277106 A | 11/2008 |
| JP | 4175026 B2 | 11/2008 |
| JP | 2008-544468 A | 12/2008 |
| JP | 2009-117365 A | 5/2009 |
| JP | 2009-135070 A | 6/2009 |
| JP | 2009-151959 A | 7/2009 |
| JP | 4287901 B2 | 7/2009 |
| JP | 2009-289726 A | 12/2009 |
| JP | 2010-15959 A | 1/2010 |
| JP | 2010-47466 A | 3/2010 |
| JP | 2010-192200 A | 9/2010 |
| JP | 2011-44364 A | 3/2011 |
| WO | 02/086993 A1 | 10/2002 |
| WO | 2004/064180 A1 | 7/2004 |

(56) References Cited

FOREIGN PATENT DOCUMENTS

| | | |
|---|---|---|
| WO | 2007/072759 A1 | 6/2007 |
| WO | 2008/084679 A1 | 7/2008 |
| WO | 2009/011157 A1 | 1/2009 |
| WO | 2009/060603 A1 | 5/2009 |
| WO | 2009/128289 A1 | 10/2009 |
| WO | 2010/049977 A1 | 5/2010 |
| WO | 2010/113512 A1 | 10/2010 |
| WO | 2010/113583 A1 | 10/2010 |
| WO | 2011/065391 A1 | 6/2011 |

OTHER PUBLICATIONS

International Preliminary Report on Patentability mailed Nov. 17, 2011 in co-pending PCT application No. PCT/JP2010/053443.
International Search Report mailed May 24, 2011 in co-pending PCT application No. PCT/JP2011/053271.
International Search Report/Written Opinion mailed Mar. 8, 2011 in co-pending PCT application No. PCT/JP2010/071723.
International Preliminary Report on Patentability mailed Jul. 12, 2012 in co-pending PCT application No. PCT/JP2010/071723.
International Search Report mailed Jan. 24, 2012 in co-pending PCT application No. PCT/JP2011/072860.
International Search Report/Written Opinion mailed Jan. 25, 2011 in co-pending PCT application No. PCT/JP2010/071724.
International Preliminary Report on Patentability issued Jul. 10, 2012 in co-pending PCT application No. PCT/JP2010/071724.
International Search Report mailed Apr. 26, 2011 in co-pending PCT application No. PCT/JP2011/052394.
International Preliminary Report on Patentability mailed Oct. 11, 2012 in co-pending PCT application No. PCT/JP2011/052394.
International Search Report mailed May 10, 2011 in co-pending PCT application No. PCT/JP2011/052399.
International Preliminary Report on Patentability mailed Oct. 11, 2012 in co-pending PCT application No. PCT/JP2011/052399.
International Search Report mailed Nov. 15, 2011 in co-pending PCT application No. PCT/JP2011/069042.
International Search Report/Written Opinion mailed Jun. 7, 2011 in co-pending PCT application No. PCT/JP2011/054935.
International Preliminary Report on Patentability mailed Oct. 11, 2012 in co-pending PCT application No. PCT/JP2011/054935.
International Search Report mailed Jun. 7, 2011 in co-pending PCT application No. PCT/JP2011/054938.
International Search Report/Written Opinion mailed May 17, 2011 in co-pending PCT application No. PCT/JP2011/054942.
International Preliminary Report on Patentability issued Oct. 2, 2012 in co-pending PCT application No. PCT/JP2011/054942.
International Search Report/Written Opinion mailed Jun. 7, 2011 in co-pending PCT application No. PCT/JP2011/054934.
International Preliminary Report on Patentability mailed Oct. 11, 2012 in co-pending PCT application No. PCT/JP2011/054934.
International Search Report/Written Opinion mailed May 17, 2011 in co-pending PCT application No. PCT/JP2011/054941.
International Preliminary Report on Patentability issued Oct. 2, 2012 in co-pending PCT application No. PCT/JP2011/054941.
International Search Report mailed May 10, 2011 in corresponding PCT application No. PCT/JP2011/055111.
International Search Report/Written Opinion mailed May 17, 2011 in co-pending PCT Application No. PCT/JP2011/053710.
International Preliminary Report on Patentability issued Oct. 2, 2012 in co-pending PCT application No. PCT/JP2011/053710.
International Search Report/Written Opinion mailed May 24, 2011 in co-pending PCT application No. PCT/JP2011/054777.
International Preliminary Report on Patentability issued Oct. 2, 2012 in co-pending PCT application No. PCT/JP2011/054777.
International Search Report mailed May 24, 2011 in co-pending PCT application No. PCT/JP2011/054781.
Written Opinion mailed Jun. 24, 2011 in co-pending PCT application No. PCT/JP2011/054781.
International Preliminary Report on Patentability mailed Oct. 11, 2012 n co-pending PCT application No. PCT/JP2011/054781.
International Search Report/Written Opinion mailed May 24, 2011 in co-pending PCT application No. PCT/JP2011/054779.
International Preliminary Report on Patentability issued Oct. 2, 2012 in co-pending PCT application No. PCT/JP2011/054779.
Electrochimica Acta, vol. 51, 2006, pp. 5581-5586, "Preparation and electrochemical properties of $LiCoO_2$-$LiNi_{0.5}Mn_{0.5}O_2$-$Li_2MnO_3$ solid solutions with high Mn contents", Sun, et al.
Office Action mailed Jun. 10, 2013 in co-pending U.S. Appl. No. 13/508,887.
Office Action mailed Jul. 16, 2013 in co-pending U.S. Appl. No. 13/514,080.
Office Action mailed Jul. 29, 2013 in co-pending U.S. Appl. No. 13/576,548.
Office Action mailed Aug. 1, 2013 in co-pending U.S. Appl. No. 13/581,546.
Office Action mailed Jul. 17, 2013 in co-pending U.S. Appl. No. 13/581,814.
Office Action mailed Jun. 19, 2013 in co-pending U.S. Appl. No. 13/582,096.
Office Action mailed Jul. 12, 2013 in co-pending U.S. Appl. No. 13/582,101.
Office Action mailed Jul. 15, 2013 in co-pending U.S. Appl. No. 13/582,113.
Office Action mailed Aug. 13, 2013 in co-pending U.S. Appl. No. 13/582,067.
International Preliminary Report on Patentability mailed Sep. 26, 2013 in co-pending PCT application No. PCT/JP2011/053271.
International Preliminary Report on Patentability mailed Oct. 10, 2013 in co-pending PCT application No. PCT/JP2011/072860.
International Preliminary Report on Patentability mailed Aug. 1, 2013 in co-pending PCT application No. PCT/JP2011/069042.
Japanese Communication mailed Oct. 1, 2013 in co-pending Japanese patent application No. JP 2012-503253.
Japanese Communication mailed Oct. 1, 2013 in co-pending Japanese patent application No. JP 2012-503255.
Japanese Communication mailed Oct. 1, 2013 in co-pending Japanese patent application No. JP 2012-503252.
International Preliminary Report on Patentability mailed Jun. 13, 2013 in co-pending PCT application No. PCT/JP2011/066722.
International Search Report mailed Jun. 5, 2012 in co-pending PCT application No. PCT/JP2012/057974.
International Journal of Inorganic Materials 3 (2001), pp. 323-329, "Structural and electrochemical properties of Li-Ni-Co oxides synthesized by wet chemistry via a succinic-acid-assisted technique", Castro-Garcia, et al.
Office Action mailed Oct. 3, 2013 in co-pending U.S. Appl. No. 13/258,120.
Final Rejection mailed Sep. 19, 2013 in co-pending U.S. Appl. No. 13/508,887.
Office Action mailed Sep. 17, 2013 in co-pending U.S. Appl. No. 13/856,514.
International Preliminary Report on Patentability mailed Nov. 22, 2012 in co-pending PCT application No. PCT/JP2011/054938.
International Preliminary Report on Patentability mailed Nov. 22, 2012 in corresponding PCT application No. PCT/JP2011/055111.
International Search Report mailed Nov. 1, 2011 in co-pending PCT application No. PCT/JP2011/066722.
International Search Report mailed Apr. 10, 2012 in co-pending PCT application No. PCT/JP2011/079535.
Office Action—Restriction—mailed Mar. 12, 2013 in co-pending U.S. Appl. No. 13/508,887.

* cited by examiner

Example 1

Example 2

Comparative Example 1

POSITIVE-ELECTRODE ACTIVE MATERIAL FOR LITHIUM ION BATTERY, POSITIVE ELECTRODE FOR LITHIUM ION BATTERY, AND LITHIUM ION BATTERY

BACKGROUND OF THE INVENTION

1. Field of the Invention

The present invention relates to a positive electrode active material for a lithium ion battery, a positive electrode for a lithium ion battery, a lithium ion battery, and a method for producing a positive electrode active material for a lithium ion battery.

2. Description of Related Art

A lithium-containing transition metal oxide is generally used as a positive electrode active material of a lithium ion battery. Specifically, lithium cobalt oxide ($LiCoO_2$), lithium nickel oxide ($LiNiO_2$), lithium manganese oxide ($LiMn_2O_4$), or the like is used, and the compounding thereof is being advanced in order to improve the performance (achievement of high capacity, cycle characteristics, storage characteristics, reduction of internal resistance, rate properties) and increase the safety. For a lithium ion battery in a large battery usage such as for car installation and load leveling, characteristics different from a conventional lithium ion battery for cell phones and personal computers are in demand.

For the improvement of battery performance, various methods are conventionally used, and for example, Patent document 1 discloses a positive electrode active material for a nonaqueous electrolyte secondary battery containing secondary particles and/or primary particles comprising a plurality of primary particles, having an average number A represented by formula (1) of 1 or more and 10 or less, a specific surface area of $0.20\ m^2/g$ or more and less than $0.50\ m^2/g$, and an alkalinity of 25 ml or less, $$A=(m+p)/(m+s) \quad (1)$$

wherein m is the number of primary particles only, p is the number of primary particles constituting secondary particles, and s is the number of secondary particles, and having a composition represented by the following formula;

$$Li_xCo_{1-y}M_yO_{2+z}$$

wherein M is one or more elements selected from Na, Mg, Ca, Y, rare earth elements, Ti, Zr, Hf, V, Nb, Ta, Cr, Mo, W, Mn, Fe, Ni, Cu, Ag, Zn, B, Al, Ga, C, Si, Sn, N, P, S, F, and Cl, $0.9 \le x \le 1.1$, $0 \le y \le 0.1$, and $-0.1 \le z \le 0.1$. Moreover, it is described that, based on the above, a battery having high load characteristics, excellent quality stability, and high capacity characteristics can be prepared.

In addition, Patent document 2 discloses a nonaqueous secondary battery comprising a positive electrode, a negative electrode and a nonaqueous electrolyte, wherein the positive electrode has a positive electrode mixture containing a lithium-containing complex oxide, a conductive aid, and a binder, the lithium-containing complex oxide is represented by a general formula $Li_{1+x+\alpha}Ni_{(1-x-y-\delta)/2}Mn_{(1-x-y-\delta)/2}M_yO_2$ [wherein $0 \le x \le 0.05$, $-0.05 \le x+\alpha \le 0.05$, $0 \le y \le 0.4$, and $-0.1 \le \delta \le 0.1$, and M is one or more elements selected from the group consisting of Mg, Ti, Cr, Fe, Co, Cu, Zn, Al, Ge, and Sn], is a complex oxide in which primary particles agglutinate to form a secondary particle, the average particle size of the primary particles is from 0.8 to 3 μm, the average particle size of the secondary particles is from 5 to 20 μm, is a mixture containing a lithium-containing complex oxide A having a BET specific surface area of from 0.6 to $2\ m^2/g$ and a lithium-containing complex oxide B having an average particle size smaller than the average particle size of secondary particles of the complex oxide A, the average particle size of the complex oxide B is ⅗ or less of the average particle size of the secondary particles of the complex oxide A, and the ratio of the complex oxide B is 10 to 40% by weight of the total positive electrode active material. Moreover, it is described that, based on the above, a nonaqueous secondary battery having high capacity, excellent cycle durability, and storage properties under high temperature can be provided.

Furthermore, Patent document 3 discloses that, when a lithium metal complex oxide represented by $LiNi_{1-x}M_xO_2$ (wherein M is at least one or more metal elements selected from the group consisting of Co, Al, Mg, Mn, Ti, Fe, Cu, Zn, and Ga, and $0.25 > x \ge 0$) is produced, in the production method to obtain a lithium metal complex oxide by mixing a nickel complex oxide obtained by heat-treating a nickel complex hydroxide in which M is dissolved or added, and a lithium compound, and heat-treating, the method for producing a positive electrode active material for a nonaqueous electrolyte secondary battery, wherein a nickel complex hydroxide in which M is previously dissolved or added is heat-treated at a temperature of 650° C. or more and less than 900° C., and a mixture of the obtained nickel complex oxide and a lithium compound is heat-treated at a temperature of 650° C. or more and 850° C. or less, and the heat treatment temperature of the mixture of the nickel complex oxide and a lithium compound is set lower than the heat treatment temperature to obtain the nickel complex oxide. Moreover, it is described that, based on the above, a secondary battery capable of achieving high capacity of battery, improving coulombic efficiency, and reducing irreversible capacity can be provided.

(Patent document 1) Japanese Patent No. 4287901
(Patent document 2) Japanese Patent No. 4070585
(Patent document 3) Japanese Patent No. 3835266

SUMMARY OF THE INVENTION

The lithium complex oxides described in Patent documents 1 to 3 specify the oxides from the viewpoint of primary particle size, specific surface area, and the like, and thereby attempting an improvement in various battery performances, but there is still room for improvement as a high quality positive electrode active material for a lithium ion battery.

Therefore, an object of the present invention is to provide a positive electrode active material for a lithium ion battery having good battery performance.

As a result of intensive studies, the present inventors have found that there is a close correlation between the oxygen amount of a positive electrode active material, the average particle size and specific surface area of primary particles, and battery performance. More specifically, it has been found that, when the oxygen amount of a positive electrode active material is a certain value or more and the average particle size and the specific surface area of primary particles are within each predetermined range, particularly good battery performance is obtained.

The present invention completed on the basis of the above-described knowledge is, in one aspect, a positive electrode active material for a lithium ion battery represented by;

$$\text{Compositional formula:} Li_xNi_{1-y}M_yO_{2+\alpha}$$

wherein M is one or more selected from Sc, Ti, V, Cr, Mn, Fe, Co, Cu, Zn, Ga, Ge, Al, Bi, Sn, Mg, Ca, B, and Zr, $0.9 \le x \le 1.1$, $0 < y \le 0.7$, and $0.05 \le \alpha \le 0.2$, which contains primary particles and has a tap density of 1.3 to $2.6\ g/cm^3$, wherein the average particle size of the primary particles is 0.3 to 3.0 μm and the specific surface area is 0.3 to 2.3 m²/g.

In one embodiment, the positive electrode active material for a lithium ion battery according to the present invention has a tap density of 1.4 to 2.6 g/cm³.

In another embodiment, the positive electrode active material for a lithium ion battery according to the present invention has a tap density of 1.8 to 2.5 g/cm³.

In yet another embodiment, the positive electrode active material for a lithium ion battery according to the present invention has, in a particle size distribution graph (x-axis: particle size [μm], y-axis: relative particle weight [%]), a maximum point in a particle size of 1 μm or more and a difference between the particle size in the maximum point and a median diameter (D50) of 1.5 μm or less.

In yet another embodiment, the positive electrode active material for a lithium ion battery according to the present invention has a particle size in the maximum point of 2 to 15 μm.

In yet another embodiment, the positive electrode active material for a lithium ion battery according to the present invention has M that is one or more selected from Mn and Co.

In yet another embodiment, the positive electrode active material for a lithium ion battery according to the present invention has the secondary particles having an average particle size of 0.6 to 3.0 μm and a specific surface area of 0.4 to 1.5 m²/g.

In yet another embodiment, the positive electrode active material for a lithium ion battery according to the present invention has the primary particles having an average particle size of 1.6 to 2.0 μm and a specific surface area of 0.5 to 1.0 m²/g.

The present invention is, in another aspect, a positive electrode for a lithium ion battery using the positive electrode active material for a lithium ion battery according to the present invention.

The present invention is, in yet another aspect, a lithium ion battery using the positive electrode for a lithium ion battery according to the present invention.

ADVANTAGEOUS EFFECT OF THE INVENTION

According to an embodiment of the invention, a positive electrode active material for a lithium ion battery having good battery performance can be provided.

DETAILED DESCRIPTION OF EMBODIMENTS (Constitution of Positive Electrode Active Material for Lithium Ion Battery)

As a material of the positive electrode active material for a lithium ion battery of the present invention, compounds useful as a general positive electrode active material for a positive electrode for a lithium ion battery can be widely used, and particularly, it is preferable to use a lithium-containing transition metal oxide such as lithium cobalt oxide ($LiCoO_2$), lithium nickel oxide ($LiNiO_2$), and lithium manganese oxide ($LiMn_2O_4$). The positive electrode active material for a lithium ion battery of the present invention prepared using the above materials is represented by;

Compositional formula: $Li_xNi_{1-y}M_yO_{2+\alpha}$ wherein M is one or more selected from Sc, Ti, V, Cr, Mn, Fe, Co, Cu, Zn, Ga, Ge, Al, Bi, Sn, Mg, Ca, B, and Zr, $0.9 \leq x \leq 1.1$, $0 < y \leq 0.7$, and $0.05 \leq \alpha \leq 0.2$.

The ratio of lithium to all metals in the positive electrode active material for a lithium ion battery is from 0.9 to 1.1, and it is because, when less than 0.9, it is difficult to maintain a stable crystalline structure, and when exceeding 1.1, the capacity is reduced.

In the positive electrode active material for a lithium ion battery of the present invention, oxygen is represented by $O_{2+\alpha}$ ($0.05 \leq \alpha \leq 0.2$) in the compositional formula as described above and is excessively contained. Thus, when used in a lithium ion battery, battery performance such as capacity, rate properties, and capacity retention are good.

The positive electrode active material for a lithium ion battery of the present invention contains primary particles, and the average particle size of the primary particles is 0.3 to 3.0 μm, and the specific surface area is 0.3 to 2.3 m²/g.

It is preferred that the average particle size of the primary particles be 0.3 to 3.0 μm as described above. When the average particle size is less than 0.3 μm, application on a current collector is difficult. When the average particle size exceeds 3.0 μm, a void is likely to be generated when filling the particles, thus filling properties are degraded. Also, the average particle size of the primary particles is preferably 0.6 to 3.0 μm and more preferably 1.6 to 2.0 μm.

It is preferred that the specific surface area be 0.3 to 2.3 m²/g as described above. It is not desirable that the specific surface area be less than 0.3 m²/g since the reaction area is reduced, current load characteristics are degraded, and the capacity is reduced. It is not desirable that the specific surface area exceeds 2.3 m²/g since the amount of the solvent used when preparing an electrode is increased and application on a current collector is difficult. In addition, the specific surface area is preferably 0.4 to 1.5 m²/g and more preferably 0.5 to 1.0 m²/g. Also, the positive electrode active material for a lithium ion battery may be a mixed powder of primary particles and secondary particles made of a plurality of the primary particles.

The positive electrode active material for a lithium ion battery of the present invention has a tap density of 1.3 to 2.6 g/cm³. When the tap density is less than 1.3 g/cm³, it is difficult to secure high capacity since the fill weight in the same volume is reduced. Also, high calcination temperature is required to improve the tap density. However, when calcination is carried out at a high temperature largely deviated from the proper calcination temperature, the tap density is increased to exceeding 2.6 g/cm³, but electrochemical properties are degraded since the layer crystalline structure of a positive electrode material is disturbed. The tap density is preferably 1.4 to 2.6 g/cm³ and more preferably 1.8 to 2.5 g/cm³.

It is preferred that the positive electrode active material for a lithium ion battery of the present invention have, in a particle size distribution graph (x-axis: particle size [μm], y-axis: relative particle weight [%]), a maximum point in a particle size of 1 μm or more and a difference between the particle size in the maximum point and a median diameter (D50) of 1.5 μm or less. According to the above constitution, the particle size and uniformity of the shape of the primary particles are good, and variation in battery performance between individual positive electrode particles is small.

The difference between the particle size in the maximum point and a median diameter (D50) is more preferably 1.0 μm or less and typically 0.2 to 1.0 μm.

In addition, it is preferred that the particle size in the maximum point be 2 to 15 μm. When the particle size in the maximum point is less than 2 μm, it is possible to cause a problem of reducing the density of the positive electrode active material in a positive electrode to have bad battery performance since the amount of an organic solvent used when making slurry by mixing a positive electrode material and a conductive material to a binder dissolved in the organic solvent (N-methylpyrrolidone) and applying the slurry on an Al foil followed by drying, and then pressing to form a positive electrode. In addition, when the particle size in the maximum point exceeds 15 μm, it is possible to cause a problem of increasing a void between the particles and reducing the tap density to have bad battery performance. The particle size in the maximum point is more preferably 2 to 11 μm.

(Constitution of Positive Electrode for Lithium Ion Battery and Lithium Ion Battery Using the Same)

The positive electrode for a lithium ion battery according to the embodiment of the present invention has, for example, a structure in which a positive electrode mixture prepared by mixing a positive electrode active material for a lithium ion battery having the above-described constitution, a conductive aid, and a binder is disposed on one surface or both surfaces of the current collector made of aluminum foil or the like. In addition, the lithium ion battery according to the embodiment of the present invention is equipped with the positive electrode for a lithium ion battery having the above constitution.

(Method for Producing Positive Electrode Active Material for Lithium Ion Battery)

Next, the method for producing a positive electrode active material for a lithium ion battery according to the embodiment of the present invention will be described in detail.

First, a metal salt solution is prepared. The metal is one or more selected from Ni, and Sc, Ti, V, Cr, Mn, Fe, Co, Cu, Zn, Ga, Ge, Al, Bi, Sn, Mg, Ca, B, and Zr. In addition, the metal salt is sulfate, chloride, nitrate, acetate, and the like, and particularly, a nitrate is preferable. This is because, a nitrate can be directly calcined even contaminated into a calcination raw material as impurities, thus washing step can be skipped, and a nitrate is functioned as an oxidant and has a function of accelerating the oxidation of the metal in the calcination raw material. Each metal contained in the metal salt is adjusted so as to be the intended molar ratio. Whereby, the molar ratio of each metal in the positive electrode active material is determined.

Next, lithium carbonate is suspended in pure water, and thereafter, a metal salt solution of the above-described metal is added thereto to prepare lithium salt solution slurry. At this time, microspheres of a lithium-containing carbonate are precipitated in the slurry. Incidentally, when the lithium compound does not react upon heat-treating sulfate, chloride, and the like as a metal salt, the lithium compound is washed with a saturated lithium carbonate solution, and then collected by filtration. When the lithium compound reacts as a lithium source in the heat treatment as nitrate or acetate, the lithium compound is not washed, directly collected by filtration, and dried, thereby capable of being used as a calcination precursor.

Then, the lithium-containing carbonate collected by filtration was dried, to obtain powder of the complex of a lithium salt (precursor for a lithium ion battery positive electrode material).

Next, a calcination vessel having a volume of predetermined size is prepared, and the powder of the precursor for a lithium ion battery positive electrode material is filled into this calcination vessel. Then, the calcination vessel filled with the powder of the precursor for a lithium ion battery positive electrode material is transferred to a calcination furnace, and calcination is carried out. Calcination is carried out by heating and maintaining for a predetermined period of time under an oxygen atmosphere. In addition, it is preferable to carry out calcination under a pressure of 101 to 202 KPa since the oxygen amount in the composition is further increased. The calcination temperature is an important factor affecting crystallinity of the positive electrode active material (composition, average particle size of primary particles, specific surface area, tap density, particle size distribution). Calcination can be carried out at 700 to 1100° C., and the calcination temperature is properly selected based on the relationship between the amount of lithium carbonate used as a raw material and the metal composition. More specifically, in order to control crystallinity of the positive electrode active material of the present invention, simple adjustment of the calcination temperature to a certain range is not enough, and it is necessary to have an appropriate calcination temperature range based on the relationship with the composition of a lithium salt complex or the like and carry out calcination in the above temperature range. For example, in the present invention, the tap density of the positive electrode active material is 1.3 to 2.6 g/cm$^3$, and in order to obtain such high tap density, it is necessary to carry out calcination at a temperature higher than the generally used calcination temperature while it depends on the composition of the lithium salt complex that is a raw material.

Thereafter, the powder is taken out from the calcination vessel and pulverized, to obtain powder of the positive electrode active material.

EXAMPLES

Examples are provided below, for better understanding of the present invention and the advantage thereof. However, the present invention is not limited to these Examples.

Examples 1 to 15

First, lithium carbonate in the amount described in Table 1 was suspended in 3.2 liter of pure water, and then 4.8 liter of a metal salt solution was charged. Here, the metal salt solution was adjusted so that each metal of a nitrate hydrate was contained in the composition ratio described in Table 1, and the mole number of all metals was 14 mol.

Incidentally, the amount of lithium carbonate suspended is the amount such that the product (lithium ion secondary battery positive electrode material, i.e., positive electrode active material) is $Li_xNi_{1-y}M_yO_{2+\alpha}$ wherein x is the value in Table 1, and is each calculated by the following formula.

$$W(g) = 73.9 \times 14 \times (1 + 0.5X) \times A$$

In the above formula, "A" is a numerical value to multiply for previously subtracting the amount of lithium by a lithium compound other than the lithium carbonate remained in the raw material after filtration, in addition to the amount required as a precipitation reaction, from the suspension amount. When the lithium salt reacts as a calcination raw material like a nitrate or acetate, "A" is 0.9, and when the lithium salt does not react as a calcination raw material like a nitrate or acetate, "A" is 1.0.

By this treatment, microspheres of a lithium-containing carbonate were precipitated in the solution, and this precipitate was collected by filtration using a filter press.

Subsequently, the precipitate was dried to obtain a lithium-containing carbonate (precursor for a lithium ion battery positive electrode material).

Next, a calcination vessel was prepared, and the lithium-containing carbonate was filled into this calcination vessel. Then, the calcination vessel was put in a furnace under air atmosphere, and heated to 900° C. over 3 hours, then heated to the maintenance temperature described in Table 1 over 4 hours, followed by maintaining at the maintenance temperature for 2 hours, then cooled over 3 hours to obtain an oxide. Next, the resulting oxide was crushed to obtain powder of a lithium ion secondary battery positive electrode material.

Example 16

As Example 16, the same treatment as in Examples 1 to 15 was carried out except for using each metal of the raw material in the composition as shown in Table 1, using a chloride as a metal salt, and precipitating a lithium-containing carbonate, followed by washing with a saturated carbonate lithium solution and filtering.

Example 17

As Example 17, the same treatment as in Examples 1 to 15 was carried out except for using each metal of the raw material in the composition as shown in Table 1, using a sulfate as a metal salt, and precipitating a lithium-containing carbonate, followed by washing with a saturated carbonate lithium solution and filtering.

Example 18

As Example 18, the same treatment as in Examples 1 to 15 was carried out except for using each metal of the raw material in the composition as shown in Table 1 and carrying out calcination under a pressure of 120 KPa not under atmospheric pressure.

Comparative Examples 1 to 7

As Comparative Examples 1 to 7, the same treatment as in Examples 1 to 15 was carried out using each metal of the raw material in the composition as shown in Table 1.

TABLE 1

| | Amount of Lithium Carbonate Suspended | Compositional Ratio of Each Metal in All Metals Except Li | | | | | | | | | | Maintenance Temperature |
|---|---|---|---|---|---|---|---|---|---|---|---|---|
| | (g) | Ni | Co | Mn | Ti | Cr | Fe | Cu | Al | Sn | Mg | (° C.) |
| Example 1 | 1396.7 | 33.3 | 33.3 | 33.3 | | | | | | | | 1030 |
| Example 2 | 1396.7 | 33.3 | 33.3 | 33.3 | | | | | | | | 1050 |
| Example 3 | 1396.7 | 33.3 | 33.3 | 33.3 | | | | | | | | 1070 |
| Example 4 | 1396.7 | 33.3 | 33.3 | 33.3 | | | | | | | | 1100 |
| Example 5 | 1350.2 | 33.3 | 33.3 | 33.3 | | | | | | | | 1050 |
| Example 6 | 1443.3 | 33.3 | 33.3 | 33.3 | | | | | | | | 1050 |
| Example 7 | 1396.7 | 65 | 20 | 15 | | | | | | | | 880 |
| Example 8 | 1396.7 | 80 | 10 | 10 | | | | | | | | 880 |
| Example 9 | 1396.7 | 33 | 33 | 33 | | | | | | | 1 | 1050 |
| Example 10 | 1396.7 | 85 | 10 | | 5 | | | | | | | 810 |
| Example 11 | 1396.7 | 85 | 10 | | | 5 | | | | | | 800 |
| Example 12 | 1396.7 | 85 | 10 | | | | 5 | | | | | 810 |
| Example 13 | 1396.7 | 85 | 10 | | | | | 5 | | | | 850 |
| Example 14 | 1396.7 | 85 | 10 | | | | | | 5 | | | 840 |
| Example 15 | 1396.7 | 85 | 10 | | | | | | | 5 | | 830 |
| Example 16 | 1551.9 | 33.3 | 33.3 | 33.3 | | | | | | | | 1050 |
| Example 17 | 1551.9 | 33.3 | 33.3 | 33.3 | | | | | | | | 1050 |
| Example 18 | 1396.7 | 33.3 | 33.3 | 33.3 | | | | | | | | 1050 |
| Comparative Example 1 | 1396.7 | 33.3 | 33.3 | 33.3 | | | | | | | | 1000 |
| Comparative Example 2 | 1396.7 | 33.3 | 33.3 | 33.3 | | | | | | | | 950 |
| Comparative Example 3 | 1303.6 | 33.3 | 33.3 | 33.3 | | | | | | | | 1050 |
| Comparative Example 4 | 1489.8 | 33.3 | 33.3 | 33.3 | | | | | | | | 1050 |
| Comparative Example 5 | 1396.7 | 33.3 | 33.3 | 33.3 | | | | | | | | 1150 |
| Comparative Example 6 | 1396.7 | 33.3 | 33.3 | 33.3 | | | | | | | | 940 |
| Comparative Example 7 | 1396.7 | 80 | 10 | 10 | | | | | | | | 790 |

(Evaluation)

The particle size distribution of each positive electrode material was determined by a laser diffraction particle size measuring instrument SALD-3000J manufactured by Shimadzu Corporation. The metal content in each positive electrode material was measured by an inductively coupled plasma optical emission spectrometry (ICP-OES), and the compositional ratio (molar ratio) of each metal was calculated. In addition, the oxygen content was measured by a LECO method, to calculate $\alpha$. The average particle size of the primary particles was calculated by observing 100 primary particles by SEM (Scanning Electron Microscope) micrographs of powder of each positive electrode material, calculating the particle size of the primary particles, and obtaining the average value. The specific surface area was defined as the BET value, and the tap density was defined as the density after 200 taps.

In addition, each positive electrode material, a conductive material, and a binder were weighed at a ratio of 85:8:7, and a positive electrode material and a conductive material were mixed to a binder dissolved in an organic solvent (N-methylpyrrolidone) to form slurry. The slurry was applied on an Al foil and dried, then pressed to form a positive electrode. Subsequently, a 2032 type coin cell in which an opposite electrode was Li was prepared for evaluation, and a discharge capacity at a current density of 0.2 C was determined using 1 M-LiPF$_6$ dissolved in EC-DMC (1:1) as an electrolyte. In addition, the ratio of the discharge capacity at a current density of 2 C on the battery capacity at a current density of 0.2 C was calculated to obtain rate properties. Moreover, the capacity retention was determined by comparing the initial discharge capacity obtained at a discharge current of 1 C at room temperature and the discharge capacity after 100 cycles.

Furthermore, for Examples and Comparative Examples, a particle size distribution graph of each positive electrode active material (x-axis: particle size [μm], y-axis: relative particle weight [%]) was drawn, and based on that, a particle size in the maximum point of the main-peak of 1 μm or more and a median diameter (D50) were confirmed.

These results are shown in Table 2.

TABLE 2

|  | X | α | Average Particle Size of Primary Particles (μm) | Specific Surface Area (m²/g) | Tap Density (g/cm³) | Discharge Capacity (mAh/g) | Rate Properties (%) | Capacity Retention (%) | Main Peak Maximum Particle Size (μm): R1 | D50 (μm): R2 | R1 − R2 (μm) |
|---|---|---|---|---|---|---|---|---|---|---|---|
| Example 1 | 1.0 | 0.20 | 1.2 | 0.92 | 1.8 | 155 | 92 | 90 | 3.5 | 2.7 | 0.8 |
| Example 2 | 1.0 | 0.13 | 1.5 | 0.79 | 2.0 | 155 | 92 | 89 | 2.9 | 2.4 | 0.5 |
| Example 3 | 1.0 | 0.11 | 1.8 | 0.56 | 2.1 | 154 | 91 | 89 | 2.9 | 2.3 | 0.6 |
| Example 4 | 1.0 | 0.07 | 3.0 | 0.37 | 2.5 | 151 | 89 | 85 | 7.8 | 6.3 | 1.5 |
| Example 5 | 0.9 | 0.11 | 1.7 | 0.83 | 1.9 | 152 | 90 | 87 | 3.5 | 2.6 | 0.9 |
| Example 6 | 1.1 | 0.15 | 1.9 | 0.51 | 2.1 | 156 | 93 | 91 | 2.9 | 2.2 | 0.7 |
| Example 7 | 1.0 | 0.07 | 2.0 | 0.52 | 2.1 | 171 | 89 | 86 | 3.5 | 3 | 0.5 |
| Example 8 | 1.0 | 0.06 | 2.8 | 0.49 | 2.4 | 185 | 85 | 82 | 2.9 | 2 | 0.9 |
| Example 9 | 1.0 | 0.13 | 1.5 | 0.74 | 2.0 | 154 | 91 | 88 | 2.9 | 2.1 | 0.8 |
| Example 10 | 1.0 | 0.06 | 1.3 | 0.86 | 1.8 | 187 | 85 | 82 | 3.5 | 2.6 | 0.9 |
| Example 11 | 1.0 | 0.17 | 1.2 | 0.93 | 1.5 | 186 | 84 | 81 | 3.5 | 2.5 | 1 |
| Example 12 | 1.0 | 0.05 | 1.2 | 0.90 | 1.5 | 180 | 84 | 80 | 3.5 | 2.5 | 1 |
| Example 13 | 1.0 | 0.07 | 2.0 | 0.49 | 2.1 | 181 | 84 | 81 | 6.4 | 5.7 | 0.7 |
| Example 14 | 1.0 | 0.06 | 1.6 | 0.68 | 1.9 | 191 | 89 | 82 | 5.3 | 4.5 | 0.8 |
| Example 15 | 1.0 | 0.06 | 1.7 | 0.60 | 1.8 | 183 | 85 | 82 | 4.3 | 3.6 | 0.7 |
| Example 16 | 1.0 | 0.09 | 1.2 | 0.91 | 1.8 | 151 | 89 | 87 | 2.9 | 2.3 | 0.6 |
| Example 17 | 1.0 | 0.08 | 1.3 | 0.85 | 1.7 | 152 | 88 | 86 | 2.9 | 2.2 | 0.7 |
| Example 18 | 1.0 | 0.19 | 1.6 | 0.75 | 2.0 | 159 | 94 | 91 | 3.5 | 2.8 | 0.7 |
| Comparative Example 1 | 1.2 | 0.20 | 0.6 | 1.38 | 1.4 | 149 | 88 | 83 | 6.4 | 4.4 | 2 |
| Comparative Example 2 | 1.0 | 0.22 | 0.3 | 2.27 | 1.3 | 149 | 87 | 82 | 9.5 | 5.7 | 3.8 |
| Comparative Example 3 | 0.8 | 0.09 | 1.1 | 0.93 | 1.7 | 143 | 81 | 75 | 3.5 | 2.1 | 1.4 |
| Comparative Example 4 | 1.2 | 0.17 | 1.6 | 0.49 | 2.2 | 147 | 87 | 84 | 3.5 | 2.7 | 0.8 |
| Comparative Example 5 | 1.0 | 0.04 | 3.4 | 0.29 | 2.7 | 143 | 78 | 73 | 14.1 | 5 | 9.1 |
| Comparative Example 6 | 1.0 | 0.23 | 0.2 | 2.69 | 1.1 | 148 | 90 | 86 | 9.5 | 3.1 | 6.4 |
| Comparative Example 7 | 1.0 | 0.21 | 0.2 | 2.18 | 1.0 | 165 | 79 | 72 | 7.2 | 2.5 | 4.7 |

According to Table 2, Examples 1 to 18 all have good battery performance.

In Comparative Example 1, from the relationship between the amount of lithium carbonate suspended, metal composition, and calcination temperature, the lithium content (x) in compositional formula: $Li_xNi_{1-y}M_yO_{2+\alpha}$ was increased, and excess lithium other than the layer crystalline structure of a positive electrode material became impurities interfering with conductivity, thus battery performance was bad.

In Comparative Examples 2, 6, and 7, the maintenance temperature in the calcination step was too low, thus growth of the particles was ununiform and insufficient, and battery performance was bad.

In Comparative Example 3, the amount of lithium carbonate suspended was too small, thus the lithium content (x) in compositional formula: $Li_xNi_{1-y}M_yO_{2+\alpha}$ was small, and battery performance was bad.

In Comparative Example 4, the amount of lithium carbonate suspended was too much, thus the lithium content (x) in compositional formula: $Li_xNi_{1-y}M_yO_{2+\alpha}$ was large, and battery performance was bad.

In Comparative Example 5, the maintenance temperature in the calcination step was too high, thus the oxygen content (2+α) in compositional formula: $Li_xNi_{1-y}M_yO_{2+\alpha}$ was small, the particles were coarsened, and battery performance was bad.

Figure 1:
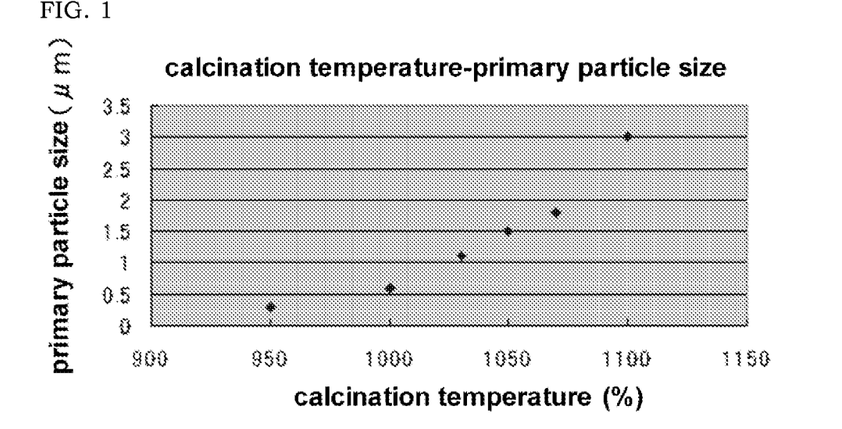
FIG. 1 is a graph of calcination temperature-primary particle size according to Examples and Comparative Examples.

Next, based on the results obtained in Examples 1, 2, 3 and 4 and Comparative Examples 1 and 2, a graph of calcination temperature-primary particle size was drawn in FIG. 1. It can be seen from FIG. 1 that, the higher the calcination temperature (maintenance temperature in calcination), the more the particle size of the primary particles grow.

Figure 2:
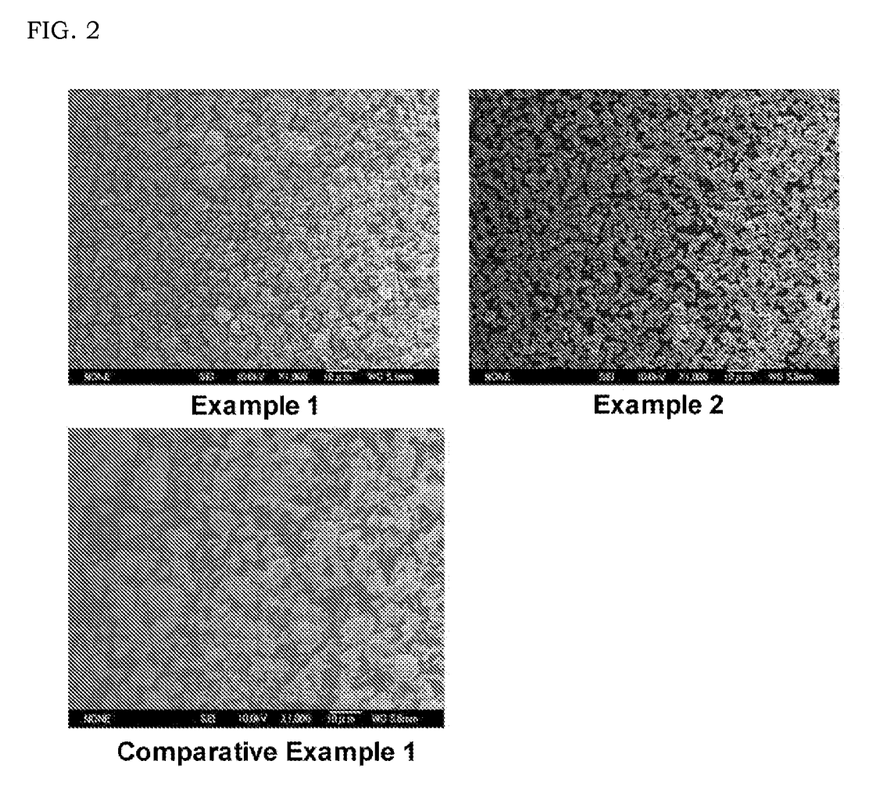
FIG. 2 is SEM micrographs according to Examples and Comparative Examples.

Next, SEM micrographs of each of Examples 1 and 2 and Comparative Example 1 are shown in FIG. 2. It can be seen from FIG. 2 that the primary particles get together to form a large particle at a calcination temperature of 1000° C. and the primary particles favorably disperse at 1030° C. This is because, in a crushing step, the primary particles are fine and thus powder is soft at a calcination temperature of 1000° C. or less, it cannot be crushed such that the secondary particles are dispersed as the primary particles, but can be crushed from the secondary particles to the primary particles at 1030° C. or more.

Figure 3:
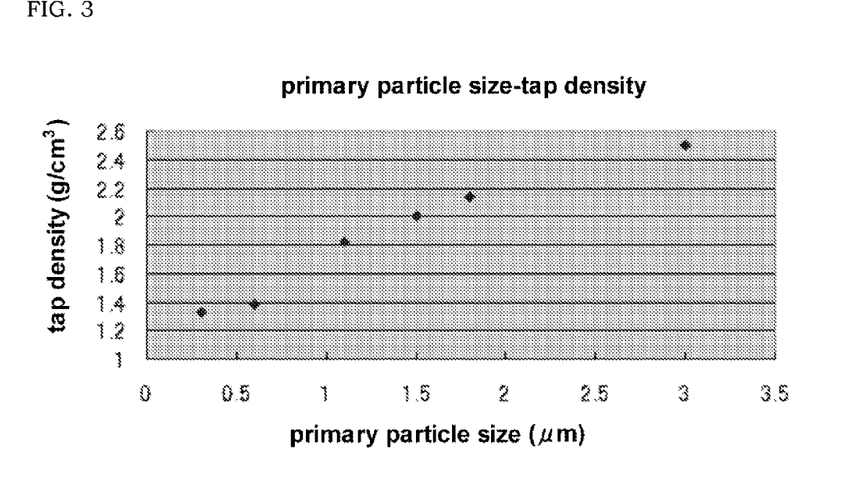
FIG. 3 is a graph of primary particle size-tap density according to Examples and Comparative Examples.

Next, based on the results obtained in Examples 1, 2, 3 and 4 and Comparative Examples 1 and 2, a graph of primary particle size-tap density was drawn in FIG. 3. It can be seen from FIG. 3 that, at a calcination temperature of 1030° C. or more in which the primary particle size is 1.2 μm, crushing properties of the obtained positive electrode active material are high, the primary particles are dispersed, and the tap density is improved.

Figure 4:
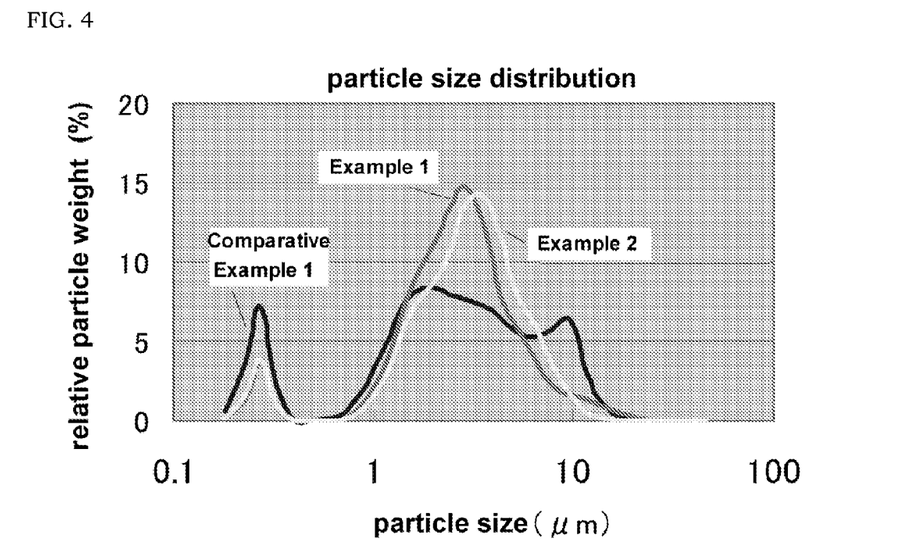
FIG. 4 is a particle size distribution graph of the positive electrode active materials according to Examples and Comparative Examples.

Furthermore, in the graph of particle size distribution of a positive electrode active material drawn as described above, the results obtained in Examples 1 and 2 and Comparative Example 1 are shown in FIG. 4. In Examples 1 and 2, at a calcination temperature of 1030° C. and 1050° C., the particles are uniformly dispersed as the primary particles by crushing, and the particle size distribution is uniform. In Comparative Example 1, the primary particles are fine at a calcination temperature of 1000° C. or less, and thus the powder is soft, it cannot be crushed such that the secondary particles are dispersed as the primary particles. Therefore, the primary particles got together to form a large particle, and thus the particle size distribution was also ununiform.

In addition, it can be seen from FIG. 4 that, in Examples 1 and 2, the graphs contain a sub-peak by fine particles with a particle size of less than 1 μm and a main-peak by particles with a particle size of 1 μm or more, and have a uniform distribution shape in which the main-peak has one maximum point. Furthermore, it can be seen that the difference between the particle size in the maximum point of the main-peak and D50 is 1.5 μm or less. As described above, in Examples 1 and 2, the particle size distribution was uniform, and thus various battery performances were good. On the other hand, in Comparative Example 1, there exists a plurality of the maximums of the main-peak, and an ununiform distribution shape is shown. Herein, the state having a plurality of the maximums of the main-peak means the state having a minimum showing a frequency of 95% or less of a maximum having a lower frequency between a maximum and a maximum. In addition, in Comparative Example 1, the difference between the particle size in the maximum point of the main-peak and D50 exceeds 1.5 μm. As described above, in Comparative Example 1, the particle size distribution was ununiform, and thus various battery performances were bad.

What is claimed is:

1. A positive electrode active material for a lithium ion battery represented by;

Compositional formula: $Li_xNi_{1-y}M_yO_{2+\alpha}$ wherein M is one or more selected from Sc, Ti, V, Cr, Mn, Fe, Co, Cu, Zn, Ga, Ge, Al, Bi, Sn, Mg, Ca, B, and Zr, $0.9 \leq x \leq 1.1$, $0 < y \leq 0.7$, and $0.05 \leq \alpha \leq 0.2$, which contains primary particles and has a tap density of 1.3 to 2.6 g/cm³, wherein the average particle size of the primary particles is 0.3 to 3.0 μm and the specific surface area is 0.3 to 2.3 m²/g, the positive electrode active material having, in a particle size distribution graph (x-axis: particle size, y-axis: relative particle weight), a maximum point in a particle size of 1 μm or more and a difference between the particle size in the maximum point and a median diameter (D50) of 1.5 μm or less.

2. The positive electrode active material for a lithium ion battery according to claim 1, having a tap density of 1.4 to 2.6 g/cm³.

3. The positive electrode active material for a lithium ion battery according to claim 2, having a tap density of 1.8 to 2.5 g/cm³.

4. The positive electrode active material for a lithium ion battery according to claim 1, having a particle size in the maximum point of 2 to 15 μm.

5. The positive electrode active material for a lithium ion battery according to claim 1, wherein M is one or more selected from Mn and Co.

6. The positive electrode active material for a lithium ion battery according to claim 1, having the primary particles having an average particle size of 0.6 to 3.0 μm and a specific surface area of 0.4 to 1.5 m²/g.

7. The positive electrode active material for a lithium ion battery according to claim 6, having the primary particles having an average particle size of 1.6 to 2.0 μm and a specific surface area of 0.5 to 1.0 m²/g.

8. A positive electrode for lithium ion battery comprising the positive electrode active material described in any one of claims 1 to 7.

9. A lithium ion battery comprising the positive electrode for lithium ion battery described in claim 8.

* * * * *